(12) United States Patent
Dambra

(10) Patent No.: US 8,902,052 B2
(45) Date of Patent: Dec. 2, 2014

(54) SCOOTER/WHEELCHAIR LIFT PLATFORM WITH BACK-UP SENSOR AND QUICK DISCONNECT

(71) Applicant: Michael J Dambra, Boca Raton, FL (US)

(72) Inventor: Michael J Dambra, Boca Raton, FL (US)

( * ) Notice: Subject to any disclaimer, the term of this patent is extended or adjusted under 35 U.S.C. 154(b) by 5 days.

(21) Appl. No.: 13/779,647

(22) Filed: Feb. 27, 2013

(65) Prior Publication Data

US 2014/0022067 A1    Jan. 23, 2014

Related U.S. Application Data

(60) Provisional application No. 61/674,011, filed on Jul. 20, 2012.

(51) Int. Cl.
*G08B 21/00* (2006.01)
*B60Q 9/00* (2006.01)
*B60P 1/44* (2006.01)

(52) U.S. Cl.
CPC .............. *B60Q 9/008* (2013.01); *B60P 1/4464* (2013.01); *B60P 1/4485* (2013.01); *B60Q 9/006* (2013.01); *B60Q 9/007* (2013.01)
USPC ........................................................ 340/431

(58) Field of Classification Search
USPC ................................ 340/431, 435, 522, 932.2
IPC ......................................... G08G 1/09, 1/142, 9/02
See application file for complete search history.

(56) References Cited

U.S. PATENT DOCUMENTS

| | | | |
|---|---|---|---|
| 2006/0119473 A1* | 6/2006 | Gunderson et al. | 340/435 |
| 2006/0233632 A1* | 10/2006 | Hayes et al. | 414/546 |
| 2012/0242473 A1* | 9/2012 | Choi | 340/441 |
| 2013/0187792 A1* | 7/2013 | Egly | 340/901 |

* cited by examiner

*Primary Examiner* — Shirley Lu
(74) *Attorney, Agent, or Firm* — Koppel, Patrick, Heybl & Philpott; Michael J. Ram

(57) ABSTRACT

A hitch mounted lift platform includes platform and lift base back-up sensors for detecting and alerting a vehicle occupant of a rear obstruction being approached to prevent collision and damage to the lift platform, items carried on the lift and the rear obstruction. The lift platform includes quick disconnect devices for connecting and disconnecting the associated wiring for easy attachment and detachment of the lift platform from the vehicle. The back-up sensors communicate with a visual display and/or speakers for visually and audibly alerting the vehicle occupant of any approaching rear obstructions. In operation, the visual display is activated when the vehicle is put in reverse. An audible alerting noise, such as beeping, is initiated by the back-up sensors detecting the vehicle is coming within a predetermined distance of an obstruction.

11 Claims, 4 Drawing Sheets

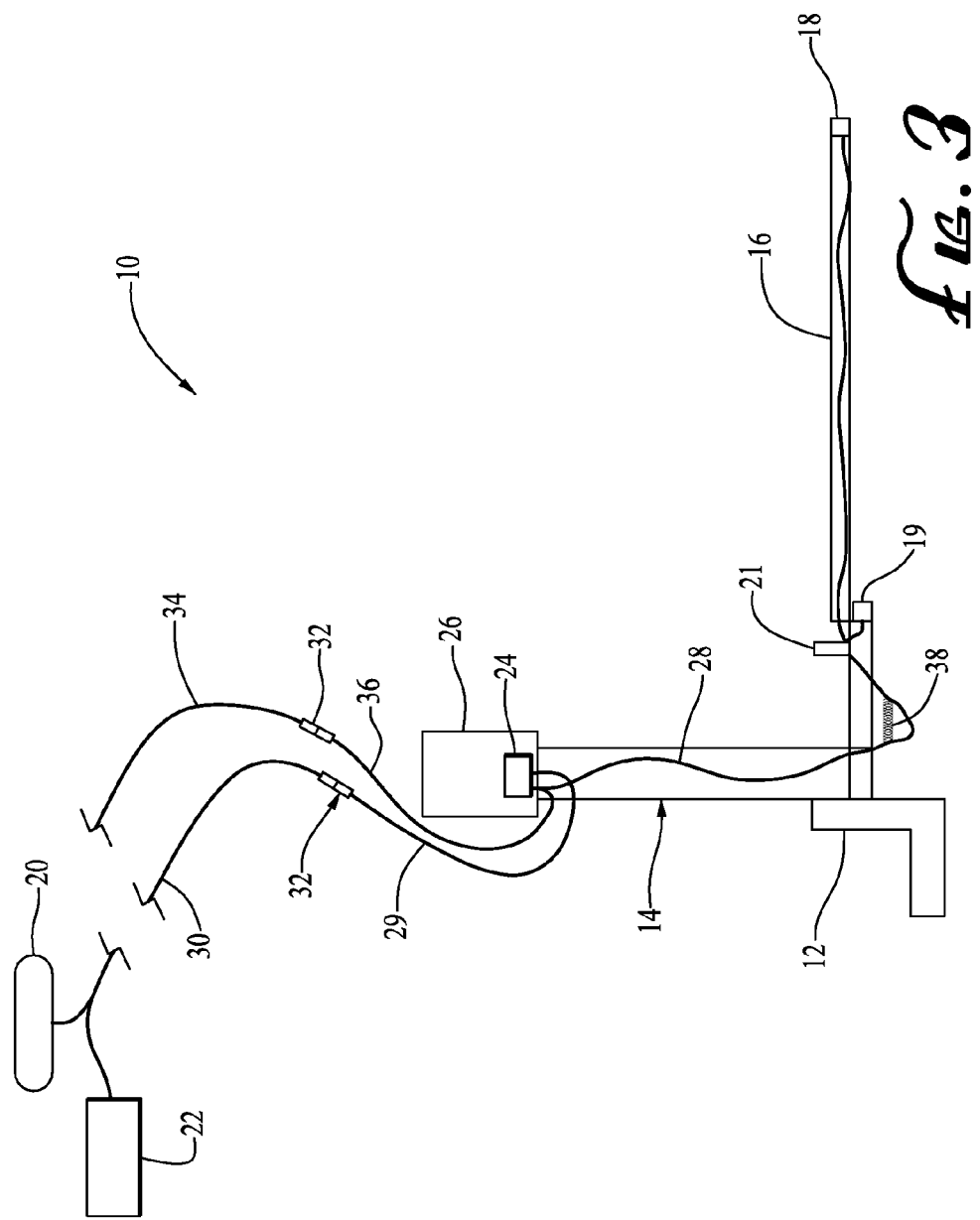

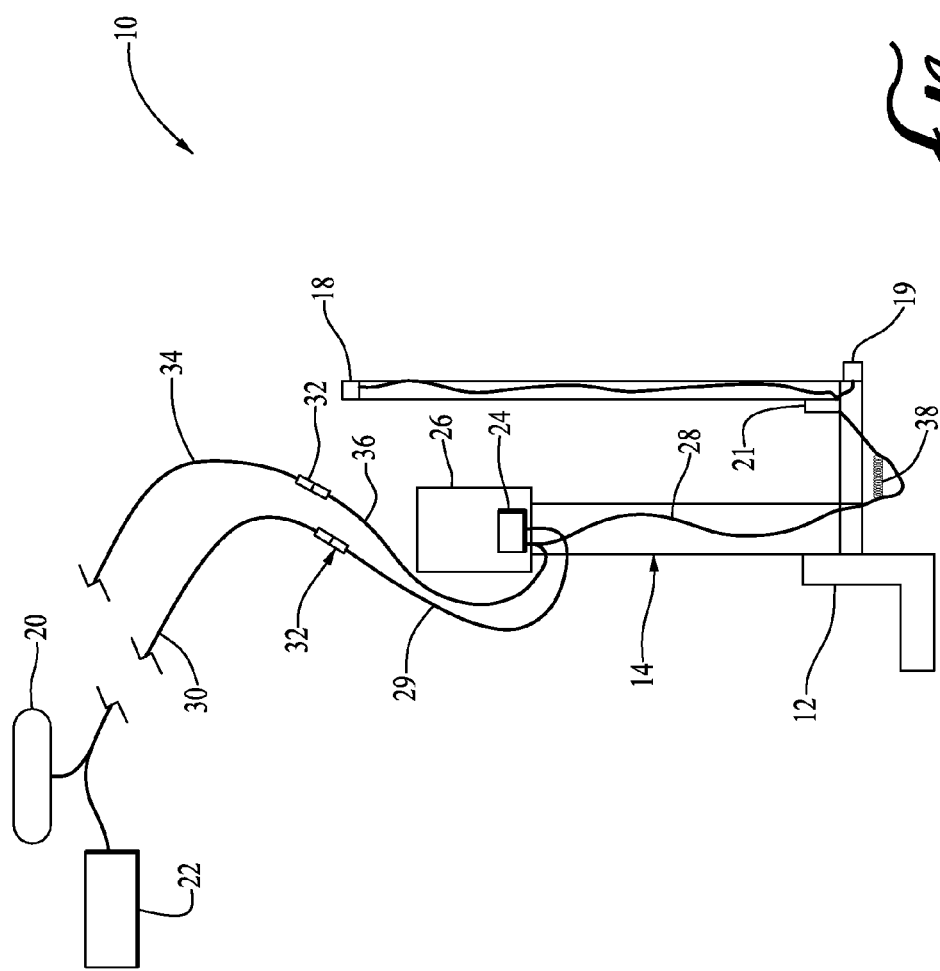

SCOOTER/WHEELCHAIR LIFT PLATFORM WITH BACK-UP SENSOR AND QUICK DISCONNECT

This application claims benefit of U.S. Provisional Application 61/674,011 filed Jul. 20, 2012.

BACKGROUND

1. Field of the Invention

The present invention relates to a lift platform hitch mounted to the back of a vehicle for carrying larger items, such as scooters and wheelchair lift platforms and, more particularly, to a lift platform having back-up sensors and a quick disconnect feature for easy detachment of the lift platform from the vehicle.

2. Discussion of the Related Art

Electronically operated lift platforms, which can be mounted to a trailer hitch on the rear of a vehicle have been available for a number of years and permit the user of a scooter, wheelchair or other mobility device to be mechanically lifted and secured to an automobile for transportation.

However, a common problem associated with the use of these prior available hitch mounted lift platforms is the vehicle operator's inability to ascertain how far the lift platform protrudes rearward from the vehicle, which results in a high frequency of accidents where the lift platform is caused to collide with a nearby car, post, or other obstruction.

In view of inadequacies associated with existing hitch mounted lift platforms, there is a need for a lift platform with one or more back-up sensors for detecting and alerting a vehicle occupant of the proximity to rear obstructions. Further, any alerting mechanisms should not interfere with the lift platform being easily detachable from the vehicle.

SUMMARY

The present invention is directed to a hitch mounted lift platform having back-up sensors, including, but not limited to platform sensors and lift base sensors, for detecting and alerting a vehicle occupant of rear obstructions in the vicinity of the platform for the purpose of preventing collision and damage to the lift platform, any items, such as scooter or wheelchair carried on the platform, or the rear obstruction. The lift platform includes quick disconnect devices for connecting and disconnecting the wiring associated with the platform sensors to allow easy attachment and detachment of the lift platform from the vehicle. The back-up sensors when attached to the vehicle are in communication with one or more alerting devices, such as a visual display and/or speakers for visually and audibly alerting the vehicle occupant that the vehicle is approaching obstructions in the rear thereof. In operation, the visual display is activated when the car is put in reverse to provide an indication of the distance between the activated backup sensor and the rearward obstruction that is being approached (e.g., a parked vehicle, pillar, post, tree or wall). In addition, or as an alternative, an audible alerting noise, such as beeping, is initiated if the back-up sensors are within a predetermined distance, such as eight to ten feet, of an obstruction. The audible altering noise can become progressively more frequent, continuous and/or louder as the back-up sensors move closer to the obstruction Still further, the proximity to the rearward obstruction can be signaled by blinking lights, lights with increasing brightness, or a series of different colored lights.

BRIEF DESCRIPTION OF THE DRAWINGS

For a fuller understanding of the nature of the present invention, reference should be made to the following detailed description taken in conjunction with the accompanying drawing in which:

FIG. 1A is an enlarged rear view of the sensor mounted to the rear of the trailer;

FIG. 3 is a side view of the lift platform shown in the down, open position; and FIG. 4 is a side view of the lift platform shown in the closed, or up position.

Like reference numerals refer to the same or similar referenced parts throughout the several views of drawings.

DETAILED DESCRIPTION

Figure 1:
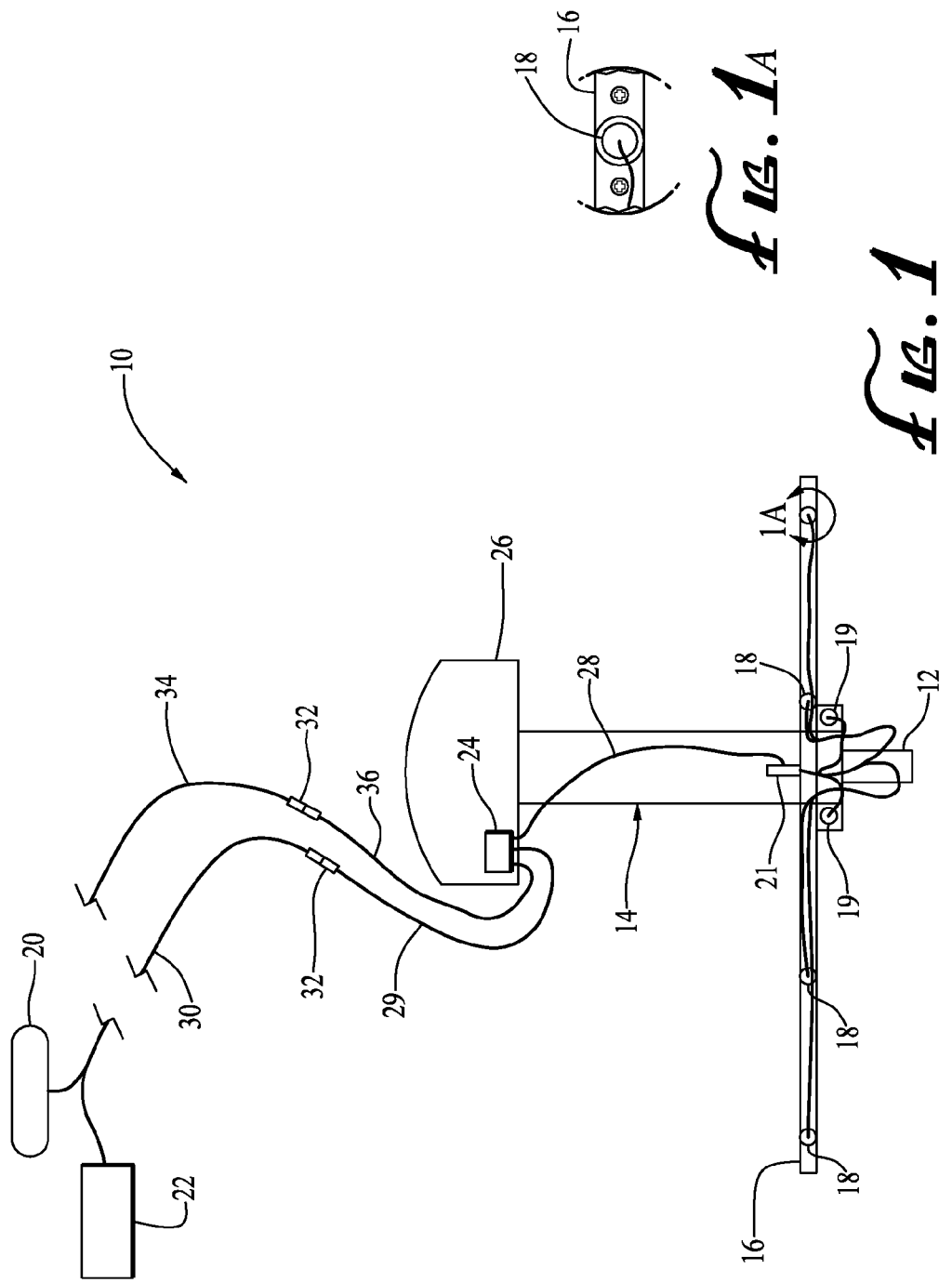
FIG. 1 is a rear view of the lift platform shown in the down, open position.

Referring to FIGS. 1, 1A and 2-4, the hitch mounted lift platform 10 having back-up sensors and quick disconnect incorporating features of the invention is shown.

The lift platform 10 includes a hitch mount 12 for removable attachment to a trailer hitch receiver on a vehicle (not shown) such as an automobile, truck, van or other motorized vehicle. The hitch mount 12 may be designed for compatibility with any of various trailer hitch receivers that can suitably support the lift platform 10. The hitch mount 12 is in secured connection with a support structure 14, which is securely connected to a loading platform 16. The support structure 14 is mechanically operable between different levels of height, including a lowered position wherein the loading platform 16 is adjacent to the sidewalk or ground for loading of devices such as a mobility device, and a raised position wherein the support structure 14 and loading platform 16 are sufficiently elevated for movement of the vehicle and transportation of the devices mounted on the platform 16.

Platform sensors 18 are secured to the loading platform 16, preferably at several locations across the rear thereof such that each platform sensor 18 is directed rearwards of the automobile when the loading platform 16 is in the down and open position. The platform sensors 18 are secured to the frame of the loading platform 16 using any sufficient securing means, such as bolting or can be integral with the platform. Optionally, lift base sensors 19 are secured to the support structure 14 such that each lift base sensor 19 is directed rearwards of the automobile when the loading platform 16 is in the closed, retracted position. A switch 21 is provided for activating the platform sensors 18 and deactivating the lift base sensors 19 when the loading platform 16 is in the down, open position as well as activating the lift base sensors 19 and deactivating the platform sensors 18 when the loading platform 16 is in the closed, retracted position.

The platform sensors 18 and lift base sensors 19 are structured for sensing the proximity of nearby obstructions within a range of the activated sensors 18, 19. The back-up sensors 18, 19 are in wired communication with alerting devices such as represented by a visual display 20 and an audible speaker 22 for visually and audibly alerting the vehicle occupant of the vehicle approaching obstructions when the automobile is backing up. In one embodiment the visual display 20 indicates the approximate distance of the nearest obstruction, as well as whether the obstruction is on the right side, the left side or immediately behind the automobile.

The back-up sensors 18, 19 are in wired communication with a back-up sensor module 24 that is located in the lift control box 26, which contains controls for moving the lift platform 10. The sensor module 24 receives input from the activated back-up sensor 18, 19 via a first sensor wire 28 and in turn communicates the input to sensor module 24 the visual display 20 and/or speakers 22 via wired connection 29 between the sensor module 24 and a second sensor wire 30 installed in the vehicle. The wire connection 29 and second sensor wire 30 are connected and disconnected using a quick disconnect device 32 that can easily connect and disconnect the ends of the wire connection 29 and second wire sensor 30. The quick disconnect device 32 may use snaps or any other efficient connection/disconnection devices.

The lift platform 10 in the shown embodiment is powered by wired connection with the back-up light wire 34 of the automobile. A power wire 36 extending from the sensor module 24 can be easily connected with and disconnected from the back-up light wire 34 via a second quick disconnect device 32. Alternatively, the lift platform 10 can be manually operable and the backup sensors can be in communication with the visual and audio display devices by a wireless communication. In such an instance, power for operation of the sensors can be provided by disposable or rechargeable batteries located preferably in the sensor module 24. In such an instance a manual shut-off switch may be provided.

The use of the quick disconnect devices 32 allows for quick and easy attachment and detachment of the wiring in lift platform 10 from the vehicle and eliminates the problem of readily connecting and disconnecting the visual display 20 and speakers 22, as well as the back-up light wire 34, to the sensor module 24.

In operation, in the wired arrangement the visual display 20 is activated when the car is put in reverse and an audible noise, such as beeping, is initiated and emitted through the speakers 22 if the activated back-up sensors 18, 19 come within a predetermined range of an obstruction, i.e., eight to ten feet, the audible alerting noise can be programmed, in a preferred embodiment to become progressively more frequent and/or louder or continuous as the activated back-up sensors 18, 19 are moved closer to the obstruction. The visual display can indicate distance to the rear object by various different modalities including, but not limited to different colored lights, a progression of one to multiple lights, various brightness lights or actual distance measurements, for example in feet, to the obstruction or percentage of a predetermined safe distance from the obstruction. A broad range of combination of various visible and audio signals may be provided. To alert the driver of the closeness to the obstruction.

Figure 2:
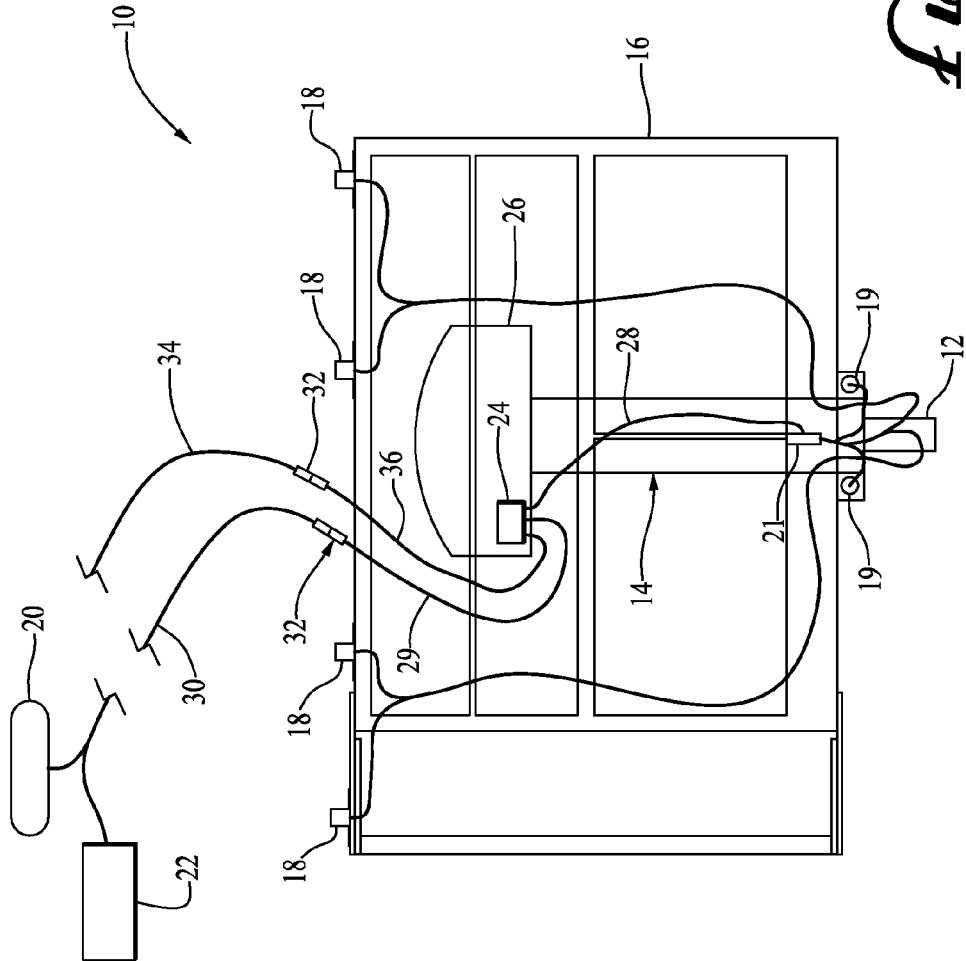
FIG. 2 is a rear view of the lift platform shown in the closed, retracted or up position.

FIGS. 2 and 4 illustrate the closed, retracted position of the lift platform 10 for transportation of the vehicle when not loaded with a mobility device. In this position, the support structure 14 is in the raised position and the loading platform 16 is rotated into a vertical position parallel to the support structure 14 for minimizing the effective length of the vehicle and attached loading platform 10.

Referring to FIGS. 3 and 4, a spring 38 is provided for containing any slack in the first sensor wire 28 that may develop during use of the lift platform 10, particularly as the lift platform 10 transitions between the raised position and lowered position.

While the present invention has been shown and described in accordance with several preferred and practical embodiments, it is recognized that departures from the instant disclosure are fully contemplated within the spirit and scope of the invention.

I claim:

1. In a trailer towed by a vehicle, said trailer having a platform mounted on a support structure, the platform moveable from a horizontal to a vertical orientation, a system for detecting the approaching proximity of an object to the rear of a towed trailer during a backup procedure wherein:
   a. when said platform is in its horizontal orientation, one or more proximity sensors mounted on a rear surface of said platform, and when said platform is in its vertical orientation, one or more proximity sensors mounted on a rear surface of said support structure, sense the proximity of the object,
   b. one or more of a display screen and an audio alert device configured to emit a sound mounted within the vehicle, said display screen in a location observable by a driver of the vehicle and said image displays in a location where the sound can be heard by said driver,
   c. a first wired connection extending from the one or more proximity sensors and a second wired connection extending from said display screen and audio alert device, the first wired connection and the second wired connection each having a mating portion of a easily joinable connector.

2. The system of claim 1 where in the display screen provides an image representing the distance of the proximity sensor to the object.

3. The system of claim 2 wherein the image displays a distance measurement to said object.

4. The system of claim 2 wherein the image displays a fraction representing a portion of a preprogrammed distance to said object.

5. The system of claim 2 wherein the image displays one or more colored lights which change color as the distance to the object is reduced to an unacceptable distance.

6. The system of claim 5 where the color of the lights is red when the object is contacted.

7. The system of claim 1 wherein the audio alert device emits a sound representing the distance of the proximity sensor to the object.

8. The system of claim 1 wherein the audio alert device emits a sound which increases in volume as the distance to the object is reduced.

9. The system of claim 7 wherein the audio alert device emits a sound which increases in volume as the distance to the object is reduced.

10. The system of claim 7 wherein the audio alert device emits a beeping sound of increasing frequency as the distance to the rear object is reduced.

11. The system of claim 7 wherein the audio alert device emits a beeping sound which changes to a continuous sound as the distance to the rear object is reduced to an unacceptable distance.

* * * * *